(12) United States Patent
Amirault et al.

(10) Patent No.: US 8,061,768 B2
(45) Date of Patent: *Nov. 22, 2011

(54) ENERGY-DISSIPATION SYSTEM

(75) Inventors: David Amirault, Easton, MA (US);
Walter S Bezaniuk, Berkley, MA (US);
Ward Fritz, Chelsea, MA (US); Joe Langley, Foxboro, MA (US); Andrew W Marsden, Hingham, MA (US); Eric Hyman, South Grafton, MA (US)

(73) Assignee: Cosco Management, Inc., Wilmington, DE (US)

( * ) Notice: Subject to any disclaimer, the term of this patent is extended or adjusted under 35 U.S.C. 154(b) by 149 days.

This patent is subject to a terminal disclaimer.

(21) Appl. No.: 12/512,798

(22) Filed: Jul. 30, 2009

(65) Prior Publication Data
US 2010/0026059 A1    Feb. 4, 2010

Related U.S. Application Data (63) Continuation-in-part of application No. 12/328,376, filed on Dec. 4, 2008, now Pat. No. 7,744,154.

(60) Provisional application No. 61/084,889, filed on Jul. 30, 2008.

(51) Int. Cl.
| | |
|---|---|
| *A47D 1/10* | (2006.01) |
| *B60N 2/42* | (2006.01) |
| *B60N 2/427* | (2006.01) |
| *B60R 21/00* | (2006.01) |
| *B60R 21/02* | (2006.01) |
| *B60R 21/055* | (2006.01) |
| *B60R 21/268* | (2011.01) |

(52) U.S. Cl. .................. 297/216.11; 297/250.1

(58) Field of Classification Search ............. 297/216.11, 297/219.12, 250.1
See application file for complete search history.

(56) References Cited

U.S. PATENT DOCUMENTS

| | | | | |
|---|---|---|---|---|
| 4,642,814 A | * | 2/1987 | Godfrey | ............................. 2/462 |
| 4,899,961 A | | 2/1990 | Herndon | |
| 4,919,483 A | | 4/1990 | Horkey | |
| 5,235,715 A | * | 8/1993 | Donzis | ......................... 12/142 R |
| 5,292,175 A | * | 3/1994 | Artz | ............................ 297/250.1 |
| 5,292,176 A | * | 3/1994 | Artz | ............................ 297/250.1 |
| 5,335,968 A | * | 8/1994 | Sheridan et al. | ............ 297/250.1 |
| 5,567,015 A | | 10/1996 | Arias | |
| 5,881,395 A | | 3/1999 | Donzis | |
| 6,485,101 B2 | | 11/2002 | Kassai et al. | |
| 6,519,780 B2 | | 2/2003 | Goodwin | |
| 7,125,073 B2 | | 10/2006 | Yoshida | |
| 7,232,182 B2 | * | 6/2007 | Yoshida | ................... 297/216.11 |

(Continued)

FOREIGN PATENT DOCUMENTS

DE    10 2005 046 651    4/2007
(Continued)

OTHER PUBLICATIONS

International Search Report dated Feb. 13, 2009, for International Application No. PCT/US2008/087382.

(Continued)

*Primary Examiner* — Rodney B White
(74) *Attorney, Agent, or Firm* — Barnes & Thornburg LLP (57) ABSTRACT

A child restraint includes a juvenile vehicle seat and an energy-absorption apparatus coupled to the juvenile vehicle seat. The energy-absorption apparatus is configured to absorb external energy associated with an external impact force applied to the energy-absorption apparatus.

24 Claims, 6 Drawing Sheets

U.S. PATENT DOCUMENTS

| | | | |
|---|---|---|---|
| 7,234,771 | B2 | 6/2007 | Nakhla |
| 7,246,853 | B2 | 7/2007 | Harcourt et al. |
| 7,293,828 | B2 * | 11/2007 | Yoshida .................. 297/216.11 |
| 7,654,613 | B2 | 2/2010 | Bass |
| 7,726,734 | B2 * | 6/2010 | Mahal et al. ............. 297/216.11 |
| 7,744,154 | B2 * | 6/2010 | Marsden et al. ......... 297/216.11 |
| 7,774,866 | B2 * | 8/2010 | Ferrara ............................ 2/455 |
| 7,850,234 | B2 * | 12/2010 | Marsden et al. ......... 297/216.11 |
| 2002/0153753 | A1 | 10/2002 | Kassai |
| 2007/0085394 | A1 * | 4/2007 | Yang .......................... 297/250.1 |
| 2007/0252418 | A1 | 11/2007 | Harcourt et al. |
| 2008/0258518 | A1 | 10/2008 | Santamaria |
| 2009/0152913 | A1 | 6/2009 | Amesar et al. |
| 2009/0179469 | A1 * | 7/2009 | Bass ........................ 297/216.12 |
| 2009/0179470 | A1 | 7/2009 | Bass |
| 2009/0256404 | A1 * | 10/2009 | Strong et al. ............. 297/216.11 |
| 2010/0019554 | A1 * | 1/2010 | Mahal et al. ............. 297/216.11 |
| 2010/0194158 | A1 * | 8/2010 | Mahal et al. ............. 297/216.11 |

FOREIGN PATENT DOCUMENTS

WO        2009076514        6/2009

OTHER PUBLICATIONS

Supplementary European Search Report Application No. 08 84 0784, dated Jun. 14, 2011.

* cited by examiner

ENERGY-DISSIPATION SYSTEM

This application claims priority under 35 U.S.C. §119(e) to U.S. Provisional Application Ser. No. 61/084,889, filed Jul. 30, 2008 and U.S. Utility application Ser. No. 12/327,376, filed Dec. 4, 2008, both of which are expressly incorporated by reference herein.

BACKGROUND

The present disclosure relates to energy-absorbing apparatus, and in particular, to devices for dissipating energy associated with external impact forces. More particularly, the present disclosure relates to an energy-dissipation system included in a juvenile product such as a child-restraint system.

When exposed to an external impact force, a juvenile vehicle seat at rest on a seat in a car or truck will accelerate as it moves to a new location in the passenger compartment of a car or truck. A child seated in such a moving juvenile vehicle seat will also accelerate as the juvenile vehicle seat moves in the passenger compartment.

A g-load is a measurement of an object's acceleration measured in gs. The g is a non-SI unit equal to the nominal acceleration due to gravity on earth at sea level. A short-term acceleration experienced by a child seated in a juvenile vehicle seat (or any other juvenile seat) that moves suddenly is called a shock and is measured in gs.

SUMMARY

An energy-dissipation system in accordance with the present disclosure is included in an apparatus that is exposed to external impact forces. In an illustrative embodiment, the energy-dissipation system is coupled to a juvenile vehicle seat to provide a child-restraint system.

In illustrative embodiments, the energy-dissipation system includes a multi-pad unit including first and second ride-down pads. The first ride-down pad comprises a first force dissipater containing a volume of air that is discharged at a metered rate when the first force dissipater is exposed to an external impact force. The first ride-down pad further includes a neighboring second force dissipater containing a volume of air that is discharged at a metered rate when the second force dissipater is exposed to an external impact force. The first and second force dissipaters thus cooperate to provide means for absorbing external energy applied to the ride-down pad to minimize g-loads experienced by a child seated in a juvenile vehicle seat exposed to an external impact force. A force dissipater in accordance with the present disclosure illustratively includes an air bag and a deformable support frame in a ported air chamber formed in the air bag.

In other illustrative embodiments, the energy-dissipation includes a multi-pad unit including three or more ride-down pads arranged in series. At least one of these ride-down pads includes two stacked force dissipaters. One of these ride-down pads may include only one force dissipater.

In illustrative embodiments, the energy-dissipation system includes two multi-pad units. A first multi-pad unit is coupled to one side of a seat back included in a juvenile seat while a second multi-pad unit is coupled to an opposite side of the seat back to cause the head and shoulders of a child (e.g., infant) seated in the juvenile seat to lie between the first and second multi-pad units.

In illustrative embodiments, each ride-down pad includes one or more air bags for holding air or other fluid in an air chamber until deformation of the air bags following exposure to an external impact force. Each air bag is formed to include an air chamber. Each air bag is made of a deformable material formed to include an air-discharge port opening into the air chamber formed in the air bag. During air bag deformation, air flows out of both of the first and second air chambers through the air-discharge port(s) formed in the air bag(s).

In illustrative embodiments, each ride-down pad also includes a deformable support frame located in the air chamber of each air bag. The deformable support frame provides means for supporting a companion air bag to maintain at least a predetermined volume of air in the air chamber until the air bag is deformed when exposed to an external impact force so that the air bag does not deform too quickly as air is discharged in a metered manner through the air-discharge ports and deforms at a rate that allows the ride-down pad to absorb external energy associated with the external impact force. External energy is absorbed as air is discharged from the air chambers of the air bags through the air-discharge ports and the deformable support frame is compressed after exposure of the air bags to an external impact force.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a child-restraint system including a juvenile seat having a seat bottom and a seat back extending upwardly from the seat bottom, a seat base located under the juvenile seat and adapted to be mated to the overlying juvenile seat and anchored to an underlying passenger vehicle seat, and an energy-dissipation system coupled to the seat back and made in accordance with a first embodiment of the present disclosure and showing that the seat back includes forwardly extending first and second side-wing panels and a backrest lying between the first and second side-wing panels and that the energy-dissipation system includes a first multi-pad unit formed to include three air-discharge ports and coupled to the first side-wing panel and a second multi-pad unit formed to include three air-discharge ports and coupled to the second side-wing panel (and partly visible in FIG. 1 through a left-side opening in a fabric cover also included in the juvenile seat);

FIG. 2 is an enlarged partial perspective view of the seat back of FIG. 1 showing that the first multi-pad unit includes a first ride-down pad located near the top edge of the seat back, a second ride-down pad located below the first ride-down pad, and a pad-retainer tether coupled to the seat back to retain the first and second ride-down pads in place on the first side-wing panel and showing that the first ride-down pad includes a first force dissipater coupled to the first side-wing panel and a second force dissipater coupled to the first force dissipater to form a pair of stacked force dissipaters and the second ride-down pad includes a single force dissipater and suggesting that the first ride-down pad is positioned high on the seat back to lie in close proximity to the head of a child seated in the juvenile seat and that the second ride-down pad is positioned relatively lower on the seat back to lie in close proximity to the shoulder of a child seated in the juvenile seat during application of an external impact force to the first side-wing panel of the seat back;

FIG. 4 is an exploded perspective assembly view of the first multi-pad unit of FIGS. 1 and 3 showing that the first multi-pad unit comprises, in sequence, from right to left, an inner tray including an inner shell (on the left) for the first ride-down pad, an inner shell (on the right) for the second ride-down pad, and a downwardly extending first strip included in the pad-retainer tether, a first cushion (on the left) for the first ride-down pad and a cushion (on the right) for the second ride-down pad, a sheet including a partition (on the left) for the first ride-down pad, an outer shell (on the right) for the second ride-down pad, and a downwardly extending second anchor strip included in the pad-retainer tether, a second cushion for the first ride-down pad, and an outer shell for the first ride-down pad;

FIGS. 5-9 show an alternative first multi-pad unit for use in the juvenile seat of FIG. 1 wherein the air-discharge ports formed in the three force dissipaters included in the first and second ride-down pads are provided by holes rather than by the cross-shaped pairs of intersecting slits shown in FIGS. 1-4;

FIG. 10 is a perspective view of a child-restraint system including a juvenile seat having a seat bottom and a seat back extending upwardly from the seat bottom, a seat base located under the juvenile seat and adapted to be mated to the overlying juvenile seat and anchored to an underlying passenger vehicle seat, and an energy-dissipation system coupled to the seat back and made in accordance with a second embodiment of the present disclosure and showing that the seat back includes forwardly extending first and second side-wing panels and a backrest lying between the first and second side-wing panels and that the energy-dissipation system includes a first multi-pad unit formed to include six air-discharge ports and coupled to the first side-wing panel and a second multi-pad unit formed to include six air-discharge ports and coupled to the second side-wing panel (and partly visible in FIG. 10 through a left-side opening in a fabric cover also included in the juvenile seat);

FIGS. 14-16 show another alternative first multi-pad unit for use in the juvenile seat of FIG. 10 wherein the air-discharge ports formed in the six force dissipaters included in the first (i.e., highest), second (i.e., high), third (i.e., low), and fourth (i.e., lowest) ride-down pads are provided by holes rather than by the cross-shaped pairs of intersecting slits shown in FIGS. 10-13;

DETAILED DESCRIPTION

Figure 1:
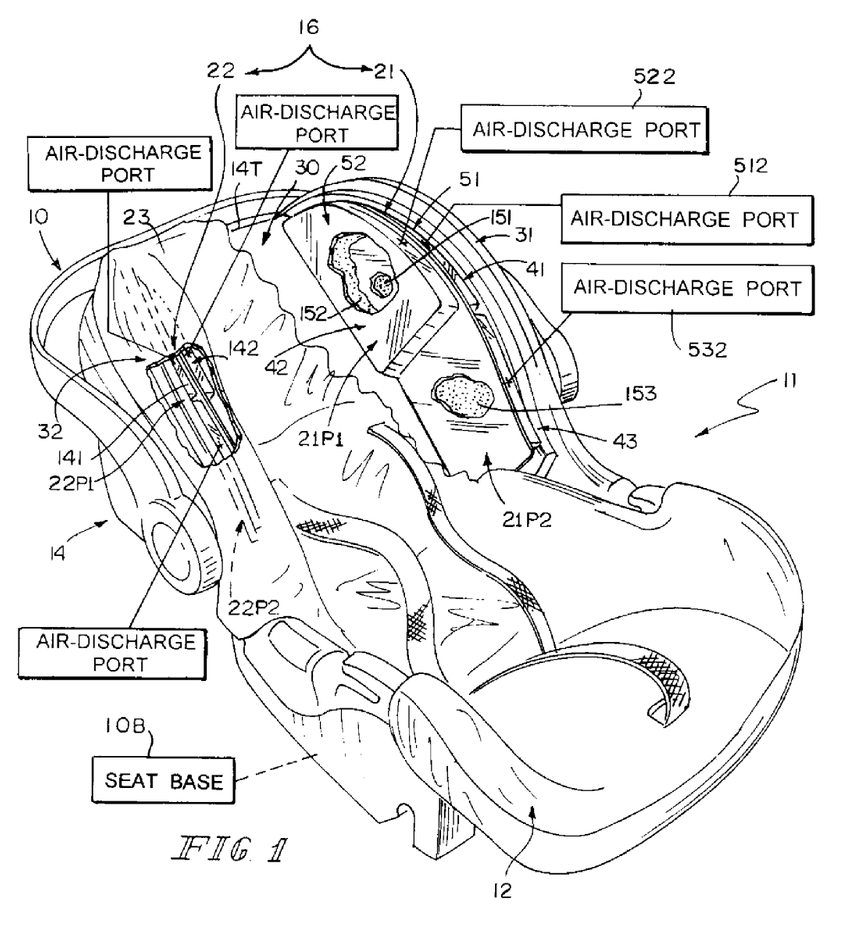

An illustrative child-restraint system 11 includes a juvenile seat 10, a seat base 10B configured to support juvenile seat 10 in a stationary position on a passenger seat (not shown) in a vehicle, and an energy-dissipation system 16 coupled to juvenile vehicle seat 10 as suggested in FIG. 1. In illustrative embodiments, juvenile vehicle seat 10 includes a seat bottom 12 and a seat back 14 extending upwardly from seat bottom 12 and carrying energy-dissipation system 16. In illustrative embodiments, juvenile seat 10 and seat base 10B cooperate to provide a rearward facing infant vehicle seat for use in a vehicle to restrain an infant in a seated position in juvenile seat 10.

Energy-dissipation system 16 comprises multi-pad units that are designed to minimize the g-loads experienced by a child 100 (e.g., infant) seated on seat bottom 12 of juvenile set 10 during exposure of seat 10 to an external impact force 20. Each multi-pad unit includes two or more ride-down pads and each ride-down pad includes one or more force dissipaters comprising air bags and deformable support frames. Multi-unit pads 21, 22 are shown, for example, in FIG. 1. As suggested in FIGS. 1 and 2, each of multi-pad units 21, 22 includes two ride-down pads. In another illustrative embodiment shown in FIGS. 10 and 11, each of multi-pad units 221, 222 includes four ride-down pads. It is within the scope of the present disclosure to provide a multi-pad unit with two or more ride-down pads.

As suggested in FIG. 1, seat back 14 of juvenile seat 10 includes a backrest 30 and forwardly extending first and second side-wing panels 31, 32. Backrest 30 is arranged to lie between and interconnect first and second side-wing panels 31, 32. First multi-pad unit 21 is coupled to first side-wing panel 31 and second multi-pad unit 22 is coupled to second side-wing panel 32 as suggested in FIGS. 1 and 2 to cause the head 101 and shoulders 102 of a child 100 (e.g., infant) seated in juvenile seat 10 to lie between first and second multi-pad units 21, 22. In the case of a premature infant, at least the head of such an infant will lie between first and second multi-pad units 21, 22.

Figures 2, 3, 4:
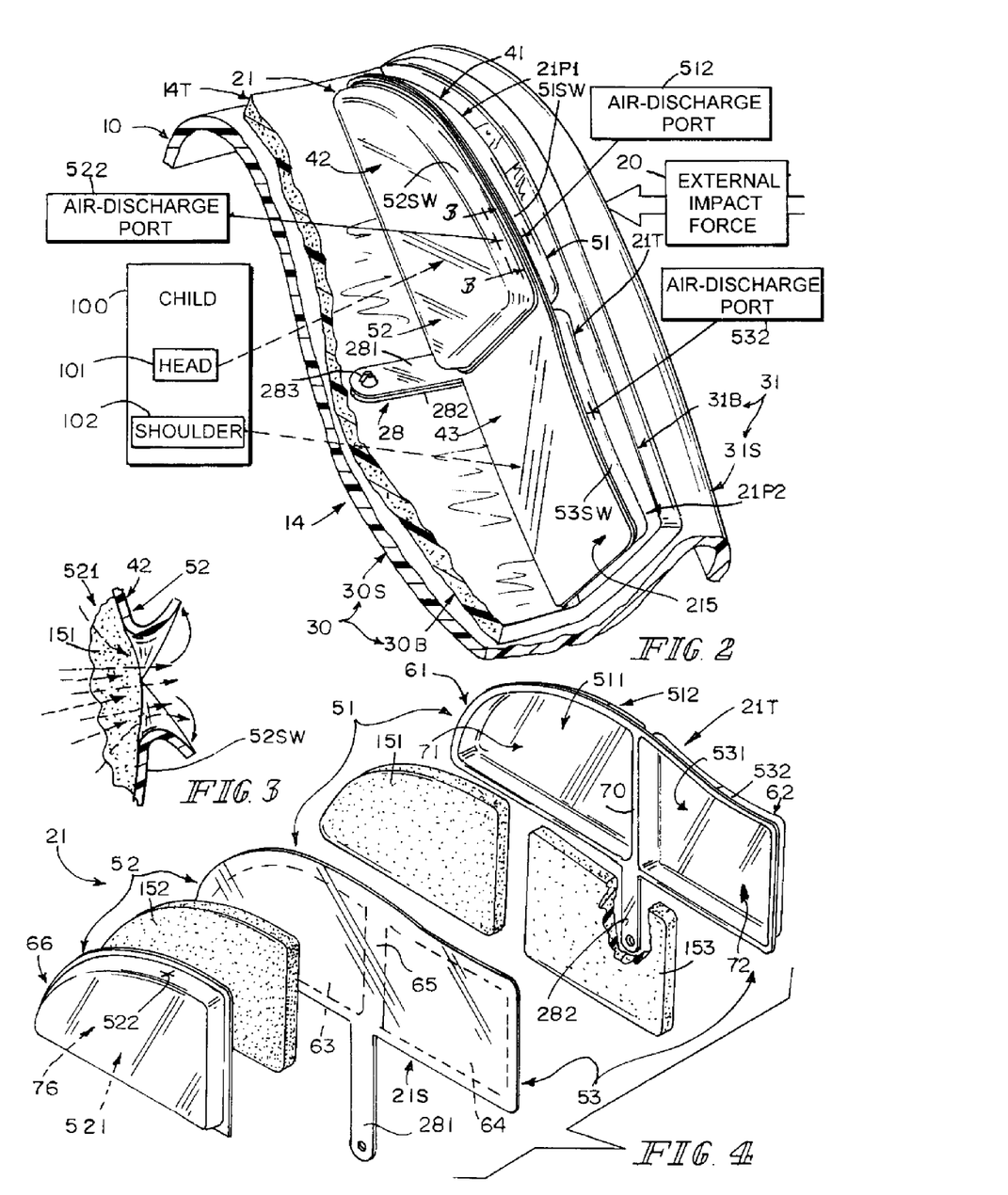
FIG. 3 is an enlarged sectional view taken along line 3-3 of FIG. 2 through the air-discharge port formed in the second force dissipater of the first ride-down pad at a moment in time after an external impact force has been applied to the first side-wing panel as suggested in FIG. 2 to cause one or more of the four adjacent corner-shaped flaps separated from one another by the cross-shaped pair of intersecting slits establishing that air-discharge port (as shown in FIG. 2) to spread apart to discharge air extant in a companion air chamber formed in the second force dissipater.
Figures 5, 6, 7, 8, 9:
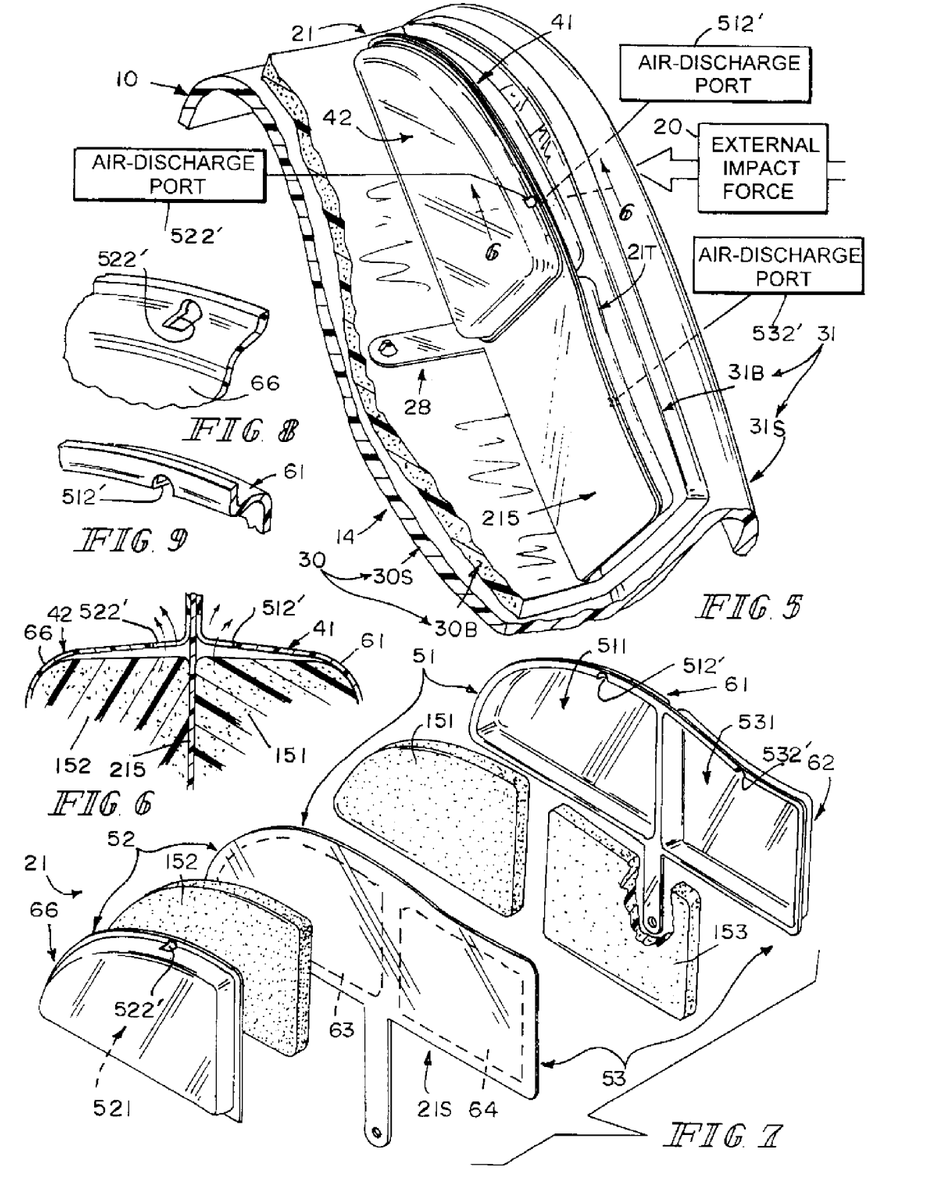
FIG. 5 is an enlarged partial perspective view similar to FIG. 2 showing that the first multi-pad unit includes a first ride-down pad located near the top edge of the seat back, a second ride-down pad located below the first ride-down pad, and a pad-retainer tether coupled to the seat back to retain the first and second ride-down pads in place on the first side-wing panel and showing that the first ride-down pad includes a first force dissipater coupled to the first side-wing panel and a second force dissipater coupled to the first force dissipater to form a pair of stacked force dissipaters and the second ride-down pad includes a single force dissipater.
FIG. 6 is an enlarged sectional view taken along line 6-6 of FIG. 5 through the air-discharge port formed in the second force dissipater of the first ride-down pad at a moment in time after an external impact force has been applied to the first side-wing panel as suggested in FIG. 5 to cause discharge of air from an air chamber formed in the first force dissipater (on the right) of the first ride-down pad through a companion air-discharge port (e.g., hole) and to cause discharge of air from an air chamber formed in the second force dissipater (on the left) of the first ride-down pad through a companion air-discharge port (e.g., hole)
FIG. 7 is an exploded perspective assembly view of the components included in the multi-pad unit shown in FIG. 5.
FIG. 8 is an enlarged perspective view of a portion of an outer shell included in the second force dissipater of FIG. 7 showing the air-discharge port formed therein.
FIG. 9 is an enlarged perspective view of a portion of an inner shell included in the first force dissipater of FIG. 7 showing the air-discharge port formed therein.

During a collision or other incident, application of an external impact force 20 to first side-wing panel 31 of seat back 14 causes energy to be transferred from an impacting object (not shown) to first multi-pad unit 21 as suggested in FIG. 2. First multi-pad unit 21 discharges air contained therein to the surroundings through one or more of air-discharge ports 512, 522, 532 formed in the ride-down pads included in first multi-pad unit 21 and absorbs energy transferred from the impacting object. Transferred energy is absorbed to minimize the magnitude of a resulting force applied to a child 100 (e.g., infant) seated in juvenile seat 10 by a force transmitter comprising first side-wing panel 31, first multi-pad unit 21, and a portion of a fabric seat cover 23 coupled to juvenile seat 10 to cover at least forwardly facing portions of seat bottom 12 and seat back 14.

As shown in FIGS. 1 and 2, first multi-pad unit 21 includes first and second ride-down pads 21P1, 21P2. Each ride-down pad 21P1, 21P2 functions to minimize the g-loads (acceleration) experienced by a child 100 seated on seat bottom 12 of juvenile seat 10 during exposure of seat 10 to an external impact force 20. Ride-down pads 21P1, 22P2 also function to maximize the time interval (i.e., ride-down time) between the moment the impacting object strikes juvenile seat 10 to apply external impact force 20 ride-down pads 21P1, 21P2 and the moment the resulting force reaches zero. Ride-down pads 22P1 and 22P2 in second multi-pad unit 22 function in a manner similar to ride-down pads 21P1, 22P2.

In an illustrative embodiment, first ride-down pad 21P1 is located on seat back 14 normally to cushion the head 101 of child 100 seated in seat 10. Second ride-down pad 21P2 is located on seat back 14 normally to cushion shoulders 102 of child 100 seated in seat 10. In the case of a premature or otherwise very small infant (not shown) being seated in seat 10 using an auxiliary premature infant restraint pad (not shown), second ride-down pad 21P2 can cushion the head of such a premature infant.

As suggested in FIG. 2, first ride-down pad 21P1 is a multi-stage ride-down pad comprising a first (inner) force dissipater 41 and a second (outer) force dissipater 42. Second ride-down pad 21P2 is a single-stage ride-down pad comprising a third force dissipater 43. In an illustrative embodiment, each of first, second, and third force dissipaters 41, 42, 43 comprises a vessel (such as a bag) containing a deformable support frame (such as a cushion). Reference is hereby made to U.S. application Ser. No. 12/327,376, filed Dec. 4, 2008 and to U.S. application Ser. No. 12/469,539, filed May 20, 2009, the entireties of which are hereby incorporated by reference herein, for various disclosures of ride-down pad and force dissipater configurations and mounting arrangements.

As suggested in FIG. 2, first and second force dissipaters 41, 42 in multi-stage first ride-down pad 21P1 are stacked in series so that first force dissipater 41 lies in an inner position between second force dissipater 42 and first side-wing panel 31 and so that second force dissipater 42 lies in an outer position in spaced-apart relation to first side-wing panel 31. First ride-down pad 21P1 is located normally to communicate with the head 101 of a child 100 seated in juvenile seat 10 as suggested diagrammatically in FIG. 2.

First (inner) force dissipater 41 provides a first stage in first ride-down pad 21P1. First force dissipater 41 includes a first air bag 51 and a first deformable support frame 151 as suggested in FIGS. 1, 2, and 4. First air bag 51 is formed to include a first air chamber 511 and an air-discharge port 512 opening into first air chamber 511. It is within the scope of this disclosure to form first air bag 51 to include more than one air-discharge port. It is expected that one air-discharge port per air bag will be sufficient for use in rear-facing seats designed to restrain low-mass infants. First deformable support frame 151 is located in first air chamber 511 as suggested in FIGS. 1, 2, and 4.

Second (outer) force dissipater 42 provides a second stage in first ride-down pad 21P1. Second force dissipater 42 includes a second air bag 52 and a second deformable support frame 152 as suggested in FIGS. 1-4. Second air bag 52 is formed to include a second air chamber 521 and an air-discharge port 522 opening into second air chamber 521. It is within the scope of this disclosure to form second air bag 52 to include more than one air-discharge port. Second deformable support frame 152 is located in second air chamber 521 as suggested in FIGS. 1-4.

Third force dissipater 43 provides a single stage in second ride-down pad 21P2. Third force dissipater 43 includes a third air bag 53 and a third deformable support frame 153 as suggested in FIGS. 1, 2, and 4. Third air bag 53 is formed to include third air chamber 531 and an air-discharge port 532 opening into the third air chamber 531. It is within the scope of this disclosure to form third air bag 53 to include more than one air-discharge port. Third deformable support frame 153 is located in third air chamber 531 as suggested in FIGS. 1, 2, and 4.

Each of deformable support frames 151, 152, 153 disclosed herein provides means for supporting a companion vessel (e.g., air bags 151, 152, 153) to maintain at least a predetermined volume of air (or other fluid) in the air chamber until the vessel is deformed when exposed to an external impact force 20. The vessel is thus supported by the companion deformable support frame 151, 152, 153 so that the vessel does not deform too quickly and deforms at a rate that allows the vessel to absorb external energy associated with the external impact force.

Each of air-discharge ports 511, 521, 531 provided in air bags 51, 52, 53 is formed to provide means for discharging air from a companion air chamber in an air bag to the surroundings outside such air bag at a metered rate when such air bag is exposed to external impact force 20. Such metering leads to a precise release of air from an air chamber when an air bag is exposed to an external impact force.

First multi-pad unit 21 of energy-dissipation system 16 is coupled to seat back 14 as shown, for example, in FIG. 2. First multi-pad unit 21 includes first and second ride-down pads 21P1, 21P2.

First ride-down pad 21P1 is located near a top edge 14T of seat back 14 to provide means for communicating normally with a head 101 of a child 100 seated in juvenile seat 10 at least when juvenile seat 10 is exposed to an external impact force 20 as suggested in FIGS. 1 and 2. First ride-down pad 21P1 includes a first force dissipater 41 coupled to seat back 14 and a second force dissipater 42 coupled to first force dissipater 41 to locate first force dissipater 41 between second force dissipater 42 and seat back 14.

Second ride-down pad 21P2 is located between first ride-down pad 21P1 and seat bottom 12 as suggested in FIG. 1 to provide means for communicating normally with shoulder 102 of a child 100 seated in juvenile seat 10 at least when juvenile seat 10 is exposed to external impact force 20 as suggested in FIG. 2. Second ride-down pad 21P2 includes a third force dissipater 43 coupled to seat back 14.

Seat back 14 includes forwardly extending first and second side-wing panels 31, 32 and a backrest 30 lying between first and second side-wing panels 31, 32 as shown in FIG. 1. First and third force dissipaters 41, 43 mate with first side-wing panel 31 to locate first multi-pad unit 21 in a space provided between the first and second side-wing panels 31, 32 as suggested in FIG. 1. It is within the scope of this disclosure to use any suitable means to retain first multi-pad unit 21 in the position shown in FIGS. 1 and 2.

In illustrative embodiments, first side-wing panel 31 includes an exterior sheet 31S made of a plastics material and an interior shock-absorber bed 31B made of a relatively soft deformable shock-absorbent material as shown best in FIG. 2. Interior shock-absorber bed 31B is located between exterior sheet 31S and second side-wing panel 32. First and third force dissipaters 41, 43 are arranged to mate with interior shock-absorber bed 31B of first side-wing panel 31 as shown, for example, in FIG. 2. First and third force dissipaters 41, 43 are coupled to one another to interconnect first and second ride-down pads 21P1, 21P2.

Backrest 30 includes an exterior sheet 30S made of a plastics material and an interior shock-absorber bed 30B made of a relatively soft deformable shock-absorbent material. First multi-pad unit 21 further includes a pad-retainer tether 28 coupled to interior shock-absorber bed 30B of backrest 30 to retain first and third force dissipaters 41, 43 in mating engagement with interior shock-absorber bed 31B of first side-wing panel 31 as shown, for example, in FIG. 2. It is within the scope of this disclosure to use any suitable adhesive or fastener to couple first and third dissipaters 41, 43 to interior shock-absorber bed 31B of first side-wing panel 31.

Juvenile seat 10 further includes a seat cover 23 made of a fabric material and coupled to seat back 14 and seat bottom 12 as suggested in FIG. 1. First, second, and third force dissipaters 41, 42, 43 are arranged to lie in a space provided between seat cover 23 and interior shock-absorber bed 31B of first side-wing panel 31 as suggested in FIG. 1. The fabric material used to make seat cover 23 can be cloth, leather, plastics, or other suitable material.

Each of the first, second, and third force dissipaters 41, 42, 43 include an air bag (51, 52, or 53) formed to include an air chamber (511, 521, or 531) and an air-discharge port (512, 522, or 532) opening into the companion air chamber and providing means for discharging air from the companion air chamber to the surroundings at a metered rate when the air bag (51, 52, or 53) is exposed to external impact force 20 so that the air bag absorbs external energy associated with external impact force 20 to minimize g-loads experienced by child 100 seated on juvenile seat 10. Each of first, second, and third force dissipaters 41, 42, 43 also includes a deformable support frame (151, 152, or 153) located in a companion air chamber and configured to maintain at least a predetermined volume of air in that companion air chamber until the air bag is deformed when exposed to external impact force 20.

The air bag (51, 52, 53) in each of the first, second, and third force dissipaters 41, 42, 43 includes a side wall arranged to face away from backrest 30 and formed to include the air-discharge port associated with said air bag to cause any air discharged from the air chambers (511, 521, 531) in the first multi-pad unit 21 to flow outwardly in a direction away from backrest 30 as suggested in FIGS. 2 and 3. First air bag 51 includes a side wall 51SW formed to include air-discharge port 512 as shown in FIG. 2. Second air bag 52 includes a side wall 52SW formed to include air-discharge port 522. Third air bag 53 includes a side wall 53SW formed to include air-discharge port 532.

Each of air-discharge ports 512, 522, 532 is a cruciform opening defined by a cross-shaped pair of orthogonal intersecting slits as suggested in FIGS. 1 and 2. As suggested in FIGS. 1-3, four adjacent corner-shaped flaps cooperate to define the slits of each air-discharge port 512, 522, 532. These flaps are spread apart as suggested in FIG. 3 to discharge air extant in a companion air chamber in response to application of external impact force 20 as suggested in FIG. 2.

First multi-pad unit 21 includes an inner tray 21T mating with the first side-wing panel 31 as suggested in FIG. 2. In an illustrative embodiment shown in FIG. 4, inner tray 21T includes a first inner shell 61 formed to include a frame-receiving cavity 71 opening away from first side-wing panel 31 and formed to include air-discharge port 512 of first force dissipater 41. Inner tray 21T also includes a second inner shell 62 formed to include a frame-receiving cavity 72 opening away from first side-wing panel 62 and formed to include air-discharge port 532 of third force dissipater 43. Inner tray 21T further includes a web 70 interconnecting first and second inner shells 61, 62 as shown in FIG. 4. In illustrative embodiments, inner tray 21T is a monolithic component made of a plastics material.

First multi-pad unit 21 also includes a sheet 21S as shown, for example, in FIGS. 2 and 4. Sheet 21S includes a partition 63 coupled to first inner shell 61 to form air chamber 51 of first force dissipater 41 therebetween and a first outer shell 64 coupled to second inner shell 62 to form air chamber 531 of third force dissipater 43 therebetween as suggested in FIG. 4. Sheet 215 is monolithic and is also formed to include a web 65 interconnecting partition 63 and outer shell 64 in an illustrative embodiment as shown in FIG. 4.

Pad-retainer tether 28 is coupled to at least one of sheet 21S and tray 21T. In illustrative embodiments, pad-retainer tether 28 includes a first anchor strip 281 coupled to sheet 21S and a second anchor strip 282 coupled to tray 21T and arranged to mate with and extent along first anchor strip 281 to form a bendable board extending away from sheet 21S and tray 21T.

Pad-retainer tether 28 also includes a fastener 283 coupled to at least one of first and second anchor strips 281, 282 and to backrest 30 to anchor first multi-pad unit 21 to seat back 14.

Deformable support frame 151 in first force dissipater 41 is located in frame-receiving cavity 71 of first inner shell 61 as suggested in FIGS. 1 and 4. Deformable support frame 153 in second force dissipater 42 is located in frame-receiving cavity 72 of second inner shell 62 as suggested in FIGS. 1 and 4.

First multi-pad unit 21 further includes a second outer shell 66 as shown in FIG. 4. Second outer shell 66 is formed to include a frame-receiving cavity 76 opening toward first side-wing panel 31 and formed to include air-discharge port 522 of second force dissipater 42. Second outer shell 66 is coupled to partition 63 included in sheet 21S to form air chamber 521 of second force dissipater 42 therebetween. Deformable support frame 152 in second force dissipater 42 is located in frame-receiving cavity 76 of second outer shell 66.

Energy-dissipation system 16 further includes a second multi-pad unit 22 coupled to seat back 14. Second multi-pad unit 22 includes a first ride-down pad 22P1 located near top edge 14T of seat back 14 to provide means for communicating normally with a head 101 of a child 100 seated in juvenile seat 10 at least when juvenile seat 10 is exposed to an external impact force 20 and a second ride-down pad 22P2 located between first ride-down pad 22P1 of second multi-pad unit 22 and seat bottom 12 to provide means for communicating normally with a shoulder 102 of a child 100 seated in juvenile seat 10 at least when juvenile seat 10 is exposed to external impact force 20.

First ride-down pad 22P1 of second multi-pad unit 22 includes a first force dissipater 141 coupled to seat back 14 and a second force dissipater 142 coupled to first force dissipater 141 to locate first force dissipater 141 between second force dissipater 142 and seat back 14. Second ride-down pad 22P2 of second multi-pad unit 22 includes a third force dissipater 143 coupled to seat back 14. First and third force dissipaters 141, 143 of second multi-pad unit mate 22 with second side-wing panel 32 to locate second multi-pad unit 22 in a space provided between second side-wing panel 32 and first multi-pad unit 21 and in spaced-apart relation to first multi-pad unit 21 to define therebetween means for receiving a head 101 and a shoulder 102 of a child 100 (i.e., infant) and for receiving at least the head of a premature infant seated in juvenile seat 10 as suggested in FIG. 1.

In the variation shown in FIGS. 5-9, each air-discharge port is provided by a hole rather than by a cross-shaped pair of intersecting slits as shown in the embodiment of FIGS. 1-4. Generally, the same reference numbers are used in FIGS. 5-9 as in FIGS. 1-4 except that the air-discharge ports in FIGS. 5-9 are renumbered as 512', 522', and 532'.

Figure 10:
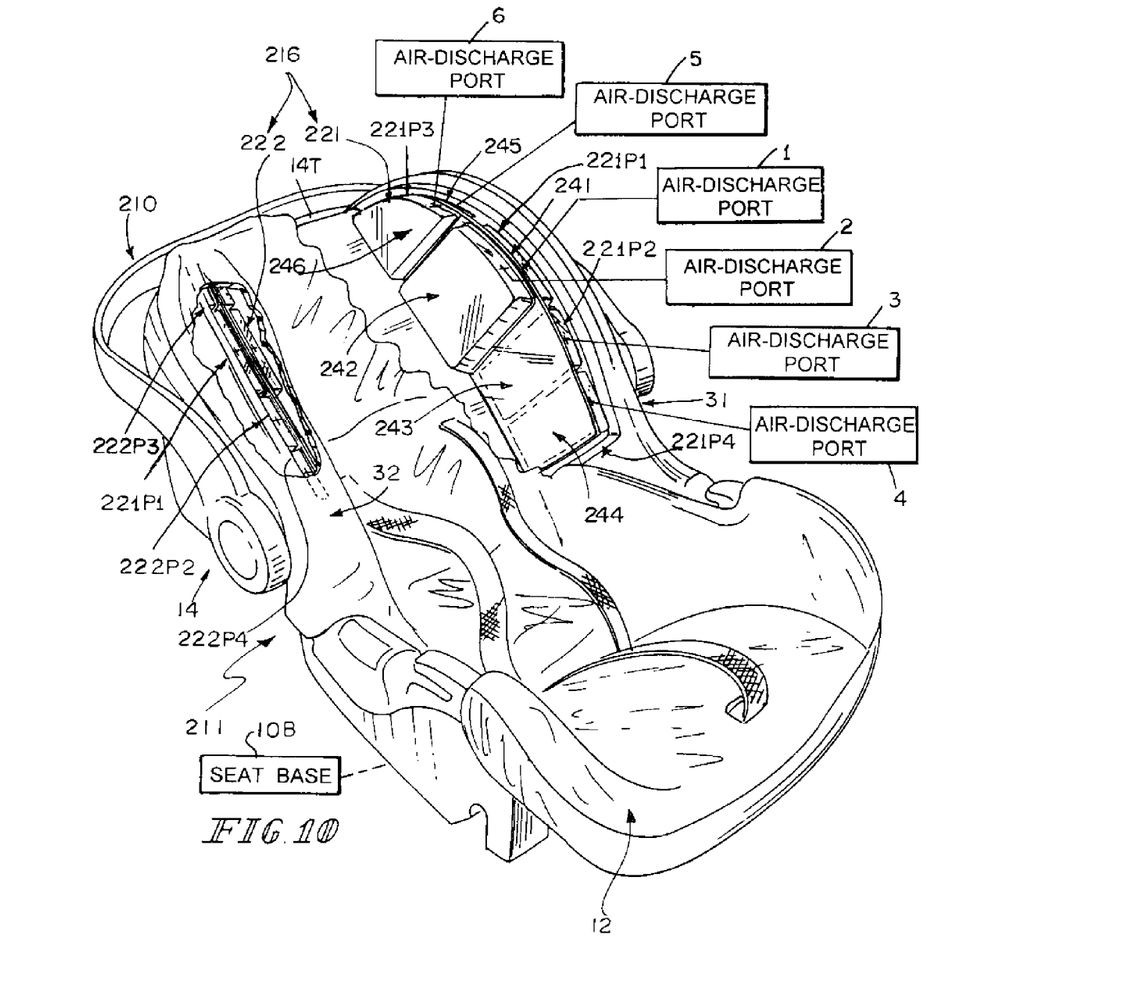

A child-restraint system 211 includes a Juvenile seat 210 including a seat bottom 12 and a seat back 14 extending upwardly from seat bottom 12 and terminating at a top edge 14T located in spaced-apart relation to seat bottom 12 as shown, for example, in FIG. 10. Child-restraint system 211 further includes an energy-dissipation system 216 coupled to seat back 14 and formed to include more than two ride-down pads on each side of seat back 14 as suggested in FIGS. 10-16. In the illustrated embodiments, four ride-down pads are included on each side of seat back 14 included in child-restraint system 211.

Energy-dissipation system 216 includes first and second multi-pad units 221, 222 coupled to seat back 14 as suggested in FIG. 10. First multi-pad unit 221 includes a series of four ride-down pads as suggested in FIGS. 10 and 11.

A highest ride-down pad 221P3 is located near top edge 14 of seat back 14. A high ride-down pad 221P1 is located between highest ride-down pad 221P3 and seat bottom 12. Highest and high ride-down pads 221P1, 221P3 cooperate to provide means for communicating normally with a head 101 of a child 100 seated in juvenile seat 210 at least when juvenile seat 210 is exposed to an external impact force 20.

Each of the highest and high ride-down pads 221P3, 221P1 includes a first head force dissipater coupled to seat back 14 and a second head force dissipater coupled to first force dissipater to locate first force dissipater between second force dissipater and seat back 14. Highest ride-down pad 221P3 includes first and second head force dissipaters 245, 246 as suggested in FIG. 10. High ride-down pad 221P1 includes first and second head force dissipaters 241, 242 as suggested in FIG. 10.

A low ride-down pad 221P2 is located between high ride-down pad 221P1 and seat bottom 12. A lowest ride-down pad 221P4 is located between low ride-down pad 221P2 and seat bottom 12. Low and lowest ride-down pads 221P2, 221P4 cooperate to provide means for communicating normally with a shoulder 102 of a child 100 seated in juvenile seat 210 at least when juvenile seat 210 is exposed to external impact force 20. Each of the low and lowest ride-down pads 221P2, 221P4 includes a shoulder force dissipater coupled to seat back 14. Low ride-down pad 221P2 includes shoulder force dissipater 243 and lowest ride-down pad 221P4 includes shoulder force dissipater 244 as shown in FIG. 10.

Seat back 14 includes forwardly extending first and second side-wing panels 31, 32 and a backrest 30 lying between first and second side-wing panels 31, 32 as suggested in FIG. 10. Each of the first head force dissipaters 245, 241 of highest and high ride-down pads 221P3, 221P1 and the shoulder force dissipaters 243, 244 of low and lowest ride-down pads 221P2, 221P4 are coupled to first side-wing panel 31 to locate first multi-pad unit 221 in a space provided between first and second side-wing panels 31, 32 as suggested in FIG. 10.

First side-wing panel 31 includes an exterior sheet 31S made of a plastics material and an interior shock-absorber bed 31B made of a relatively soft deformable shock-absorbent material and located between exterior sheet 31S and second side-wing panel 32. Each of the first head force dissipaters 245, 241 of highest and high ride-down pads 221P3, 221P1 and the shoulder force dissipaters 243, 244 of low and lowest ride-down pads 221P2, 221P4 are arranged to mate with interior shock-absorber bed 31B of first side-wing panel 31.

Each of head force dissipaters 241, 242, 245, 246 and the shoulder force dissipaters 243, 244 include an air bag formed to include an air chamber and an air-discharge port opening into the air chamber. The air-discharge port provides means for discharging air from the air chamber to the surroundings at a metered rate when the air bag is exposed to external impact force 20 so that the air bag absorbs external energy associated with external impact force 20 to minimize g-loads experienced by a child 100 seated on juvenile seat 210.

Energy-dissipation system 216 further includes a second multi-pad unit 222 that is similar to first multi-pad unit 221 as suggested in FIG. 10. Second multi-pad unit 222 is coupled to seat back 14 as suggested in FIG. 10.

Second multi-pad unit 222 includes a series of four ride-down pads as suggested in FIG. 10. A highest ride-down pad 222P3 is located near top edge 14T of seat back 14. A high ride-down pad 222P1 is located between highest ride-down pad 222P3 and seat bottom 12. The highest and high ride-down pads 222P3, 222P1 cooperate to provide means for communicating normally with a head 101 of a child 100 seated in juvenile seat 210 at least when juvenile seat 210 is exposed to an external impact force 20. A low ride-down pad 222P2 is located between high ride-down pad 222P1 and seat bottom 12. A lowest ride-down pad 222P4 is located between low ride-down pad 222P2 and seat bottom 12. The low and lowest ride-down pads 222P2, 222P4 cooperate to provide means for communicating normally with a shoulder 102 of a child 100 seated in juvenile seat 210 at least when juvenile seat 210 is exposed to external impact force 20.

Each of highest and high ride-down pads 222P3, 222P1 includes a first head force dissipater coupled to seat back 14 and a second head force dissipater coupled to the first force dissipater to locate the first force dissipater between the second force dissipater and seat back 14. Each of low and lowest ride down pads 222P2, 222P4 includes a shoulder force dissipater coupled to seat back 14. The first head force dissipaters of second multi-pad unit 222 mate with second side-wing panel 32 to locate second multi-pad unit 222 in a space provided between second side-wing panel 32 and first multi-pad unit 221 and in spaced-apart relation to first multi-pad unit 221 to define therebetween means for receiving a head 101 and a shoulder 102 of a child 100 seated in juvenile 210.

Figures 11, 12, 13:
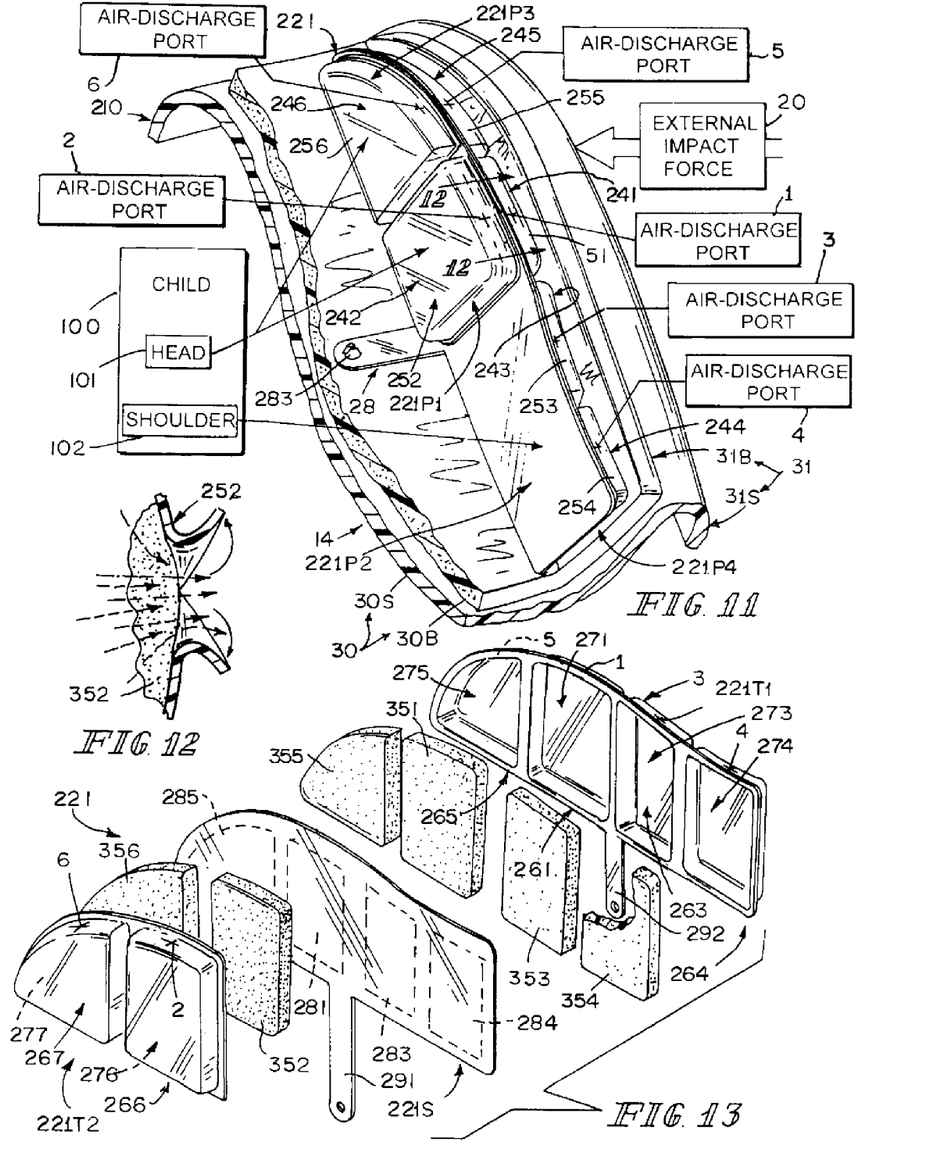
FIG. 11 is an enlarged partial perspective view of the seat back of FIG. 10 showing the first multi-pad unit includes four ride-down pads and a pad-retainer tether coupled to the seat back to retain the four ride-down pads in place on the first side-wing panel and showing that each of the two higher ride-down pads are positioned to lie in close proximity to the head of a child seated in the juvenile seat and that each of the two lower ride-down pads are positioned to lie in close proximity to the shoulder of a child seated in the juvenile seat during application of an external impact force to the first side-wing panel of the seat back.
FIG. 12 is an enlarged sectional view taken along line 12-12 of FIG. 11 through the air-discharge port formed in the second force dissipater of the second ride-down pad at a moment in time after an external impact force has been applied to the first side-wing panel as suggested in FIG. 11 to cause one or more of the four adjacent corner-shaped flaps separated from one another by the cross-shaped pair of intersecting slits establishing that air-discharge port (as shown in FIG. 11) to spread apart to discharge air extant in a companion air chamber formed in the second force dissipater included in the second ride-down pad.
FIG. 13 is an exploded perspective assembly view of the components included in the first multi-pad unit provided with four ride-down pads shown in FIG. 11.

As suggested in FIG. 13, first multi-pad unit 221 includes an inner tray 221T1, an outer tray 221T2, a sheet 221S, a first set of deformable support frames 355, 351, 353, 354 arranged to lie between sheet 221S and inner tray 221T2, and a second set of deformable support frames 356, 352 arranged to lie between outer tray 221T2 and sheet 221S. Second multi-pad unit 222 includes similar components arranged in a similar manner.

Inner tray 221T1 includes, in series, inner shells 265, 261, 263, and 264 as suggested in FIG. 13. Inner shell 265 is formed to include a frame-receiving cavity 275 sized to receive deformable support frame 355 therein and air-discharge port 5 opening into cavity 275. Inner shell 261 is formed to include a frame-receiving cavity 271 sized to receive deformable support frame 351 therein and air-discharge port 1 opening into cavity 271. Inner shell 263 is formed to include a frame-receiving cavity 273 sized to receive deformable support frame 353 therein and air-discharge port 3 opening into cavity 273. Inner shell 264 is formed to include a frame-receiving cavity 274 sized to receive deformable support frame 354 therein and air-discharge port 4 opening into cavity 274. Inner tray 221T1 also includes anchor strip 282 as shown, for example, in FIG. 13. As suggested in FIG. 13, each pair of adjacent inner shells is interconnected by a web arranged to lie therebetween.

Sheet 221S includes, in series, partition 285, partition 281, outer shell 283, and outer shell 284. Partition 285 is coupled to inner shell 255 to form an air chamber containing deformable support frame 355 therein. Partition 281 is coupled to inner shell 261 to form an air chamber containing deformable support frame 351 therein. Outer shell 283 is coupled to inner shell 263 to form an air chamber containing deformable support frame 353 therein. Outer shell 284 is coupled to inner shell 264 to form an air chamber containing deformable support frame 354 therein. Sheet 221S also includes anchor strip 291 a shown in FIG. 13. As suggested in FIG. 13, each pair of adjacent partitions 285, 281 and/or outer shells 283, 284 is interconnected by a web arranged to lie therebetween.

Outer tray 2212 includes, in series, outer shells 267, 266 as suggested in FIG. 13. Outer shell 267 is formed to include a frame-receiving cavity 277 sized to receive deformable support frame 356 therein and air-discharge port 6 opening into cavity 277. Partition 285 of sheet 221S is coupled to outer shell 267 to form an air chamber containing deformable support frame 356 therein. Outer shell 266 is formed to include a frame-receiving cavity 276 sized to receive deformable support frame 352 therein and air-discharge port 2 opening into cavity 276. Partition 281 of sheet 221S is coupled to outer shell 266 to form an air chamber containing deformable support frame 352 therein. As suggested in FIG. 13, a web is included in outer tray 221T2 and arranged to interconnect outer shells 267, 266.

Each of air-discharge ports 1, 2, 3, 4, 6, and 6 is a cruciform opening defined by a cross-shaped pair of orthogonal intersecting slits as suggested in FIGS. 10-13. As suggested in FIGS. 10-13, four adjacent corner-shaped flaps cooperate to define the slits of each air-discharge port 1, 2, 3, 4, 5, and 6. These flaps are spread apart as suggested in FIG. 12 to discharge air extant in a companion air chamber in response to application of external impact force 20 as suggested in FIG. 11.

Figures 14, 15, 16:
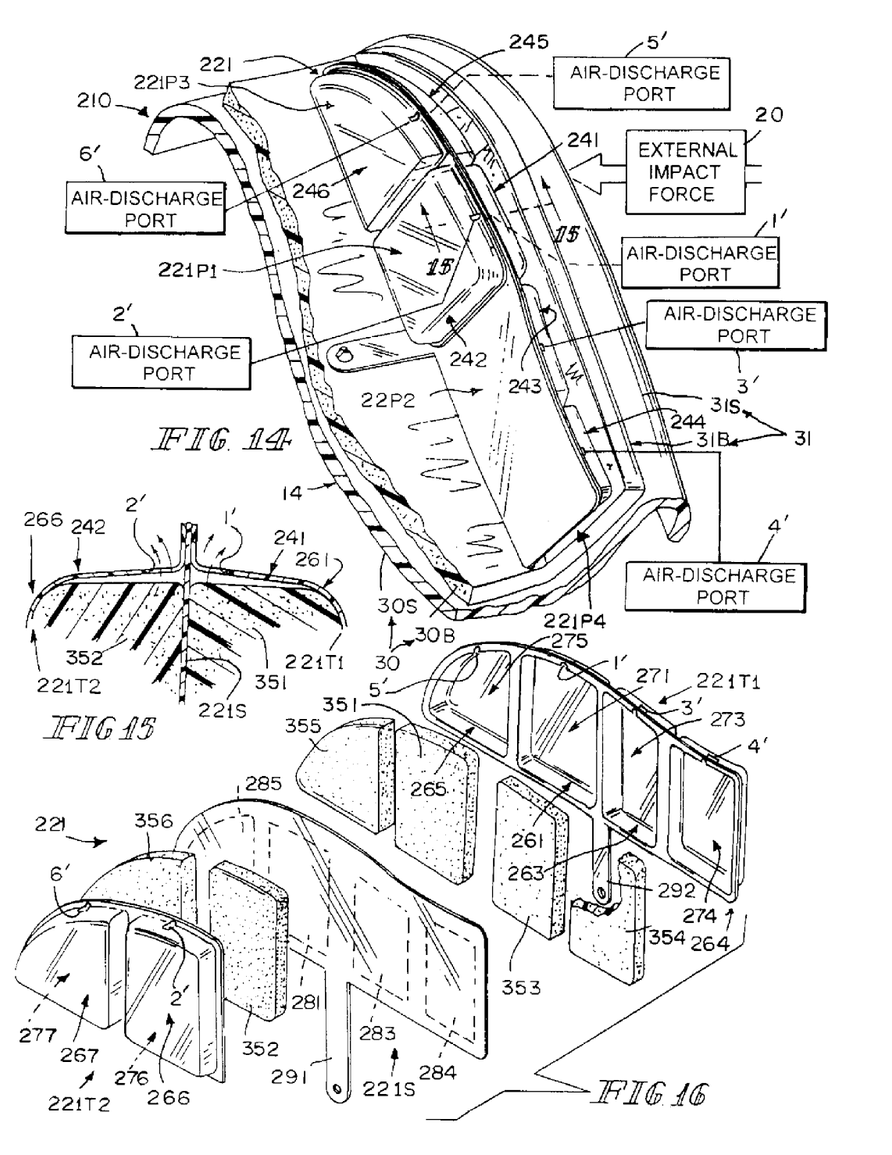
FIG. 14 is an enlarged partial perspective view similar to FIG. 11 showing that the first multi-pad unit includes four ride-down pads and a pad-retainer tether coupled to the seat back to retain the four ride-down pads in place on the first side-wing panel and showing that the highest and high ride-down pads include a pair of stacked force dissipaters and the low and lowest ride-down pads include a single force dissipater.
FIG. 15 is an enlarged sectional view taken along line 6-6 of FIG. 5 through the air-discharge port formed in the second force dissipater of the high ride-down pad at a moment in time after an external impact force has been applied to the first side-wing panel as suggested in FIG. 14 to cause discharge of air from an inner air chamber formed in the high ride-down pad through an air-discharge port formed in the inner shell of the high ride-down pad and to cause discharge of air from an outer air chamber formed in the high ride-down pad through an air-discharge port formed in the outer shell of the high ride-down pad.
FIG. 16 is an exploded perspective assembly view of the components included in the first multi-pad unit shown in FIG. 14.

In the variation shown in FIGS. 14-16, each air-discharge port is provided by a hole rather than by a cross-shaped pair of intersecting slits as shown in the embodiment of FIGS. 10-13. Generally, the same reference numbers are used in FIGS. 14-16 as in FIGS. 10-13 except the at the air-discharge ports in FIGS. 14-16 are renumbered as 1', 2', 3', 4', 5', and 6'.

The invention claimed is:

1. A child-restraint system comprising
a juvenile seat including a seat bottom and a seat back extending upwardly from the seat bottom and terminating at a top edge located in spaced-apart relation to the seat bottom and
an energy-dissipation system coupled to the seat back, wherein the energy-dissipation system includes a first multi-pad unit coupled to the seat back, the first multi-pad unit includes a first ride-down pad located near the top edge of the seat back to provide means for communicating with a head of a child seated in the juvenile seat at least when the juvenile seat is exposed to an external impact force and a second ride-down pad located between the first ride-down pad and the seat bottom to provide means for communicating with a shoulder of a child seated in the juvenile seat at least when the juvenile seat is exposed to the external impact force, the first ride-down pad includes a first force dissipater coupled to the seat back and a second force dissipater coupled to the first force dissipater to locate the first force dissipater between the second force dissipater and the seat back, and the second ride-down pad includes a third force dissipater coupled to the seat back.

2. The child-restraint system of claim 1, wherein the seat back includes forwardly extending first and second side-wing panels and a backrest lying between the first and second side-wing panels and the first and third force dissipaters mate with the first side-wing panel to locate the first multi-pad unit in a space provided between the first and second side-wing panels.

3. The child-restraint system of claim 2, wherein each of the first, second, and third force dissipaters include an air bag formed to include an air chamber and an air-discharge port opening into the air chamber and providing means for discharging air from the air chamber to the surroundings at a metered rate when the air bag is exposed to the external impact force so that the air bag absorbs external energy associated with the external impact force to minimize g-loads experienced by a child seated on the juvenile seat and a deformable support frame located in the air chamber and configured to maintain at least a predetermined volume of air in the air chamber until the air bag is deformed when exposed to the external impact force.

4. The child-restraint system of claim 3, wherein the air bag in each of the first, second, and third force dissipaters includes a side wall arranged to face away from the backrest and formed to include the air-discharge port associated with said air bag to cause any air discharged from the air chambers in the first multi-pad unit to flow outwardly in a direction away from the backrest.

5. The child-restraint system of claim 4, wherein the deformable support frame in the first force dissipater is located in the frame-receiving cavity of the first inner shell and the deformable support frame in the second force dissipater is located in the frame-receiving cavity of the second inner shell.

6. The child-restraint system of claim 3, wherein the first multi-pad unit includes an inner tray mating with the first side-wing panel and including a first inner shell formed to include a frame-receiving cavity opening away from the first side-wing panel and formed to include the air-discharge port of the first force dissipater and a second inner shell formed to include a frame-receiving cavity opening away from the first side-wing panel and formed to include the air-discharge port of the third force dissipater and the first multi-pad unit further includes a sheet including a partition coupled to the first inner shell to form the air chamber of the first force dissipater therebetween and a first outer shell coupled to the second inner shell to form the air chamber of the third force dissipater therebetween.

7. The child-restraint system of claim 6, wherein the sheet included in the first multi-pad unit is monolithic and is formed to include a web interconnecting the first and second inner shells.

8. The child-restraint system of claim 6, wherein the pad-retainer tether is coupled to at least one of the sheet and the tray.

9. The child-restraint system of claim 6, wherein the pad-retainer tether includes a first anchor strip coupled to the sheet, a second anchor strip coupled to the tray and arranged to mate with and extend along the first anchor strip to form a bendable board extending away from the sheet and the tray, and a fastener coupled to at least one of the first and second anchor strips and to the backrest to anchor the first multi-pad unit to the seat back.

10. The child-restraint system of claim 6, wherein the first multi-pad unit further includes a second outer shell formed to include a frame-receiving cavity opening toward the first side-wing panel and formed to include the air-discharge port of the second force dissipater and the second outer shell is coupled to the partition included in the sheet to form the air chamber of the second force dissipater therebetween.

11. The child-restraint system of claim 10, wherein the deformable support frame in the first force dissipater is located in the frame-receiving cavity of the first inner shell, the deformable support frame in the second force dissipater is located in the frame-receiving cavity of the second outer shell, and the deformable support frame in the third force dissipater is located in the frame-receiving cavity of the second inner shell.

12. The child-restraint system of claim 2, wherein the energy-dissipation system further includes a second multi-pad unit coupled to the seat back, the second multi-pad unit includes a first ride-down pad located near the top edge of the seat back to provide means for communicating with a head of a child seated in the juvenile seat at least when the juvenile seat is exposed to an external impact force and a second ride-down pad located between the first ride-down pad of the second multi-pad unit and the seat bottom to provide means for communicating with a shoulder of a child seated in the juvenile seat at least when the juvenile seat is exposed to the external impact force, the first ride-down pad of the second multi-pad unit includes a first force dissipater coupled to the seat back and a second force dissipater coupled to the first force dissipater to locate the first force dissipater between the second force dissipater, and the second ride-down pad of the second multi-pad unit includes a third force dissipater coupled to the seat back, and wherein the first and third force dissipaters of the second multi-pad unit mate with the second side-wing panel to locate the second multi-pad unit in a space provided between the second side-wing panel and the first multi-pad unit and in spaced-apart relation to the first multi-pad unit to define therebetween means for receiving a head and a shoulder of a child seated in the juvenile seat.

13. The child-restraint of claim 12, wherein the air bag in each of the first, second, and third force dissipaters in each of the first and second multi-pad units includes a side wall arranged to face away from the backrest and formed to include the air-discharge port associated with said air bag to cause any air discharged from the air chambers in the first and second multi-pad units during exposure of the air bags to the external impact force to flow outwardly in a direction away from the backrest.

14. The child-restraint system of claim 2, wherein the first side-wing panel includes an exterior sheet made of a plastics material and an interior shock-absorber bed made of a relatively soft deformable material and located between the exterior sheet and the second side-wing panel and the first and third force dissipaters are arranged to mate with the interior shock-absorber bed of the first side-wing panel.

15. The child-restraint system of claim 14, wherein the first and third force dissipaters are coupled to one another to interconnect the first and second ride-down pads.

16. The child-restraint system of claim 14, wherein the backrest includes an exterior sheet made of a plastics material and an interior shock-absorber bed made of a relatively soft deformable material and the first multi-pad unit further includes a pad-retainer tether coupled to the interior shock-absorber bed of the backrest to retain the first and third force dissipaters in mating engagement with the interior shock-absorber bed of the first side-wing panel.

17. The child-restraint system of claim 14, wherein the juvenile seat further includes a seat cover made of a fabric material and coupled to the seat back and seat bottom and the first, second, and third force dissipaters are arranged to lie in a space provided between the seat pad and the interior shock-absorber bed of the first side-wing panel.

18. A child-restraint system comprising
a juvenile seat including a seat bottom and a seat back extending upwardly from the seat bottom and terminating at a top edge located in spaced-apart relation to the seat bottom and
an energy-dissipation system coupled to the seat back, wherein the energy-dissipation system includes a first multi-pad unit coupled to the seat back, the first multi-pad unit includes a series of four ride-down pads, wherein a highest ride-down pad is located near the top edge of the seat back, a high ride-down pad is located between the highest ride-down pad and the seat bottom, the highest and high ride-down pads cooperate to provide means for communicating with a head of a child seated in the juvenile seat at least when the juvenile seat is exposed to an external impact force, a low ride-down pad is located between the high ride-down pad and the seat bottom, a lowest ride-down pad is located between the low ride-down pad and the seat bottom, the low and lowest ride-down pads cooperate to provide means for communicating with a shoulder of a child seated in the juvenile seat at least when the juvenile seat is exposed to the external impact force, each of the highest and high ride-down pads includes a first head force dissipater coupled to the seat back and a second head force dissipater coupled to the first force dissipater to locate the first force dissipater between the second force dissipater, and each of the low and lowest ride-down pads includes a shoulder force dissipater coupled to the seat back.

19. The child-restraint system of claim 18, wherein the seat back includes forwardly extending first and second side-wing panels and a backrest lying between the first and second side-wing panels and each of the first head force dissipaters of the highest and high ride-down pads and the shoulder force dissipaters of the low and lowest ride-down pads are coupled to the first side-wing panel to locate the first multi-pad unit in a space provided between the first and second side-wing panels.

20. The child-restraint system of claim 19, wherein the first side-wing panel includes an exterior sheet made of a plastics material and an interior shock-absorber bed made of a relatively soft deformable material and located between the exterior sheet and the second side-wing panel and each of the first head force dissipaters of the highest and high ride-down pads and the shoulder force dissipaters of the low and lowest ride-down pads are arranged to mate with the interior shock-absorber bed of the first side-wing panel.

21. The child-restraint system of claim 19, wherein each of the first and second head force dissipaters and the shoulder force dissipaters include an air bag formed to include an air chamber and an air-discharge port opening into the air chamber and providing means for discharging air from the air chamber to the surroundings at a metered rate when the air bag is exposed to the external impact force so that the air bag absorbs external energy associated with the external impact force to minimize g-loads experienced by a child seated on the juvenile seat.

22. The child-restraint of claim 21, wherein the air bag in each of the first and second head force dissipaters includes a side wall arranged to face away from the backrest and formed to include the air-discharge port associated with said air bag to cause any air discharged from the air chambers in the first multi-pad unit to flow outwardly in a direction away from the backrest.

23. The child-restraint of claim 18, wherein the energy-dissipation system further includes a second multi-pad unit, the second multi-pad unit coupled to the seat back, the second multi-pad unit includes a series of four ride-down pads, wherein a highest ride-down pad is located near the top edge of the seat back, a high ride-down pad is located between the highest ride-down pad and the seat bottom, the highest and high ride-down pads cooperate to provide means for communicating with a head of a child seated in the juvenile seat at least when the juvenile seat is exposed to an external impact force, a low ride-down pad is located between the high ride-down pad and the seat bottom, a lowest ride-down pad is located between the low ride-down pad and the seat bottom, the low and lowest ride-down pads cooperate to provide means for communicating with a shoulder of a child seated in the juvenile seat at least when the juvenile seat is exposed to the external impact force, each of the highest and high ride-down pads includes a first head force dissipater coupled to the seat back and a second head force dissipater coupled to the first force dissipater to locate the first force dissipater between the second force dissipater and the seat back, and each of the low and lowest ride-down pads includes a shoulder force dissipater coupled to the seat back, and wherein the first head force dissipaters of the second multi-pad unit mate with the second side-wing panel to locate the second multi-pad unit in a space provided between the second side-wing panel and the first multi-pad unit and in spaced-apart relation to the first multi-pad unit to define therebetween means for receiving a head and a shoulder of a child seated in the juvenile seat.

24. The child restraint of claim 23, wherein the air bag in each of the first and second head force dissipaters includes a side wall arranged to face away from the backrest and formed to include the air-discharge port associated with said air bag to cause any air discharged from the air chambers in the first multi-pad unit to flow outwardly in a direction away from the backrest.

* * * * *